May 14, 1957  G. F. FREDERICKS  2,792,321
PRINTER'S BLANKET
Filed May 10, 1954
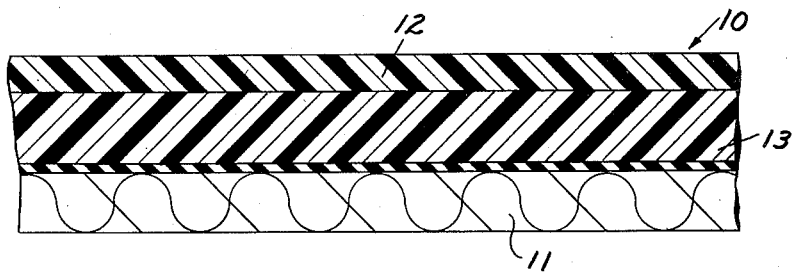
INVENTOR.
GEORGE F. FREDERICKS
BY
ATTORNEYS

United States Patent Office 2,792,321
Patented May 14, 1957

2,792,321
PRINTER'S BLANKET

George F. Fredericks, Trenton, N. J., assignor to National Automotive Fibres, Inc., Detroit, Mich., a corporation of Delaware Application May 10, 1954, Serial No. 428,549

7 Claims. (Cl. 154—54.5)

This invention relates generally to a new article of manufacture composed of laminated sheets and refers more particularly to an improved printer's blanket.

It is an object of this invention to provide a printer's blanket which is sufficiently resilient to effectively compensate for irregularities in the printing surfaces and, at the same time, has a relatively hard, smooth top surface which is moisture proof and may be readily cleaned when desired.

It is another object of this invention to provide the printer's blanket with a base sheet which is dimensionally stable and prevents stretching or shrinking of the sheet during use.

It is a further object of this invention to provide a, printer's blanket which may be readily produced on a high volume production basis at a reasonable cost and which may be used repeatedly over long periods.

The foregoing as well as other objects of this invention will be made more apparent as this description proceeds especially when considered in connection with the accompanying drawing wherein:

The single figure is an enlarged fragmentary sectional view of a printer's blanket embodying the features of this invention.

In the drawing, the numeral 10 indicates a printer's blanket comprising a base sheet 11, a top or cover sheet 12, and an intermediate sheet 13 bonded or otherwise laminated to the base and cover sheets. The base sheet 11 imparts dimensional stability to the blanket 10 or, in other words, prevents shrinking and/or stretching of the blanket 10 during use.

In detail, the base sheet 11 comprises a fabric such, for example, as undyed, sanforized cotton and a composition comprising a resinous constituent and a rubber constituent applied in any suitable manner to the top surface of the fabric. The composition found highly satisfactory in practice comprises copolymerized butadiene-acrylonitrile rubber and copolymerized vinyl chloride-vinyl acetate resin. The arrangement is such that the resinous composition is effectively reinforced by the fabric and imparts both strength and resiliency to the product. The proportions of the rubber and resin may be varied but highly satisfactory results are obtained by combining two parts of the rubber aforesaid with one part of the resin or by combining two parts of the resin with one part of the rubber. In any case, the proportions of the rubber and resin in the compound should be such to not only obtain the required and resiliency but, in addition, to provide the compound with the adhesive characteristics required to assure adhering the same to both the fabric and intermediate sheet 13.

The intermediate sheet 13 is soft and resilient to impart the required cushioning qualities to the blanket. In the present instance, the sheet 13 comprises a resin such as polyvinyl chloride containing a plasticizer and a stabilizing agent. The plasticizer is used in sufficient quantities to afford the degree of softness and resiliency required, and satisfactory results have been obtained by employing a phthalate as a plasticizing agent. In order to maintain the relatively soft, resilient qualities of the product for long periods of use, barium and cadmium are preferred as a stabilizing agent. One part of barium with one part of cadmium for one hundred parts of resin has been found satisfactory.

The top or cover sheet 12 is also formed of plastic modified to provide the blanket 10 with a hard and smooth top surface. The cover sheet 12 is also resilient, impervious to moisture, highly sensitive to impressions, highly resistant to ink solvents, and capable of withstanding considerable use for long periods without appreciable wear. In practice it has been found that particularly satisfactory results are obtained by forming the cover sheet 12 of polyvinyl chloride resin plasticized with dicyclohexyl phthalate and stabilized with barium and cadmium compounds. The dicyclohexyl phthalate acts to impart hardness and resilience to the cover sheet and is employed in the quantities required to provide the hardness and resilience desired. In practice, about forty parts of plasticizer is used for one hundred parts of resin and eighteen to twenty of the forty parts of plasticizer is dicyclohexyl phthalate. The required stabilizing effect is obtained by using about one part of barium and one part of cadmium compounds with one hundred parts of resin.

The three sheets of the blanket 10 are bonded together to provide an integral unit capable of being installed in the printing equipment. The laminating or bonding operation may be accomplished in various ways. For example, after the sheets are properly positioned relative to one another they may be passed between rolls or placed between plates of a press. In either case, the sheets are heated during the laminating process to a temperature sufficiently high to render the plastic sheets tacky.

Although the thickness of the various laminations may vary, nevertheless, particularly satisfactory results are obtained with a blanket wherein the intermediate or cushioning sheet 13 is about twice the thickness of the relatively hard covering sheet 12. In most cases it has been found that a blanket having a covering sheet 12 of about five gauge and having an intermediate sheet of approximately ten gauge is satisfactory.

What I claim as my invention is:

1. A laminated printer's blanket consisting of a base comprising a woven fabric having applied to its inner surface a composition consisting of resinous and rubber constituents to impart lateral dimensional stability to the blanket, an intermediate relatively soft resilient ply of plasticized polyvinyl chloride attached directly to said base, and an outer cover layer of plasticized polyvinyl chloride attached directly to said intermediate ply, said cover layer being resilient, substantially harder than said intermediate ply, impervious to moisture, highly resistant to ink solvents, and resistant to wear, said intermediate ply having a thickness of about 10 gauge and said cover layer having a thickness of about 5 gauge.

2. A laminated printer's blanket consisting of a base comprising a woven fabric to impart lateral dimensional stability to the blanket, an intermediate relatively soft resilient ply of plasticized polyvinyl chloride attached directly to said base, and an outer cover layer of plasticized polyvinyl chloride attached directly to said intermediate ply, said cover layer having as the plasticizer dicyclohexyl phthalate and being resilient, substantially harder than said intermediate ply, impervious to moisture, highly resistant to ink solvents, and resistant to wear, said intermediate ply being approximately twice as thick as said cover layer.

3. A laminated printer's blanket consisting of a base comprising a woven fabric to impart lateral dimensional stability to the blanket, an intermediate relatively soft resilient ply of plasticized polyvinyl chloride attached directly to said base, and an outer cover layer of plasticized polyvinyl chloride attached directly to said intermediate ply, said cover layer having about 18–20 parts of dicyclohexyl phthalate to 100 parts of polyvinyl chloride and being resilient, substantially harder than said intermediate ply, impervious to moisture, highly resistant to ink solvents, and resistant to wear, said intermediate ply being approximately twice as thick as said cover layer.

4. A laminated printer's blanket consisting of a base, an intermediate ply, and a cover layer; said base consisting of a woven fabric having applied to the inner surface thereof in the blanket a composition consisting of a resinous and a rubber constituent each constituting at least one-third by weight of the composition; said intermediate ply consisting of plasticized polyvinyl chloride resin and being relatively soft and resilient; said cover layer consisting of polyvinyl chloride resin plasticized with dicyclohexyl phthalate and being thinner and substantially harder than said intermediate ply.

5. A laminated printer's blanket consisting of a base, an intermediate ply, and a cover layer; said base consisting of a woven fabric having applied to the inner surface thereof in the blanket a composition consisting of a resinous and a rubber constituent each constituting at least one-third by weight of the composition; said intermediate ply consisting of plasticized polyvinyl chloride resin and being relatively soft and resilient; said cover layer consisting of polyvinyl chloride resin plasticized with dicyclohexyl phthalate and being substantially harder than said intermediate ply, said intermediate ply being about twice as thick as said cover layer.

6. A laminated printer's blanket consisting of a base, an intermediate ply, and a cover layer; said base consisting of a woven fabric having applied to the inner surface thereof in the blanket a composition consisting of a resinous and a rubber constituent each constituting at least one-third by weight of the composition; said intermediate ply consisting of plasticized polyvinyl chloride resin and being relatively soft and resilient; said cover layer consisting of polyvinyl chloride resin plasticized with dicyclohexyl phthalate and being substantially harder than said intermediate ply, said intermediate ply having a thickness of about 10 gauge and said cover layer having a thickness of about 5 gauge.

7. A printer's blanket having a relatively hard smooth upper surface which is impervious to moisture, resistant to ink solvents and highly sensitive to impressions, and having lateral dimensional stability, said blanket comprising a working surface provided by laminations of polyvinyl chloride resin plasticized by dicyclohexyl phthalate, said laminations consisting of a relatively thin, relatively hard upper lamination and an intermediate relatively thick, relatively soft lamination, a bonding composition at the underside of the laminated polyvinyl chloride resin and a reinforcing woven base fabric bonded to said laminated polyvinyl chloride resin by said bonding composition, said bonding composition consisting essentially of a vinyl resin and a rubber compatible therewith.

References Cited in the file of this patent

UNITED STATES PATENTS

| | | |
|---|---|---|
| 602,797 | Annison | Apr. 19, 1898 |
| 1,853,258 | Cattran | Apr. 12, 1932 |
| 2,065,442 | Freedlander | Dec. 22, 1936 |
| 2,232,989 | Wooddell | Feb. 25, 1941 |
| 2,330,353 | Henderson | Sept. 28, 1943 |
| 2,453,052 | Van Etten | Nov. 2, 1948 |
| 2,500,891 | Alexander | Mar. 14, 1950 |
| 2,601,525 | Howald et al. | June 24, 1952 |
| 2,653,886 | Gentle et al. | Sept. 29, 1953 |